United States Patent
Larmo et al.

(10) Patent No.: US 11,153,803 B2
(45) Date of Patent: Oct. 19, 2021

(54) METHOD AND DEVICE FOR UPDATING THE NUMBER OF RETRANSMISSIONS IN A WIRELESS MESH NETWORK

(71) Applicant: Telefonaktiebolaget LM Ericsson (publ), Stockholm (SE)

(72) Inventors: Anna Larmo, Espoo (FI); Piergiuseppe Di Marco, Teramo (IT)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 16/756,108

(22) PCT Filed: Oct. 27, 2017

(86) PCT No.: PCT/EP2017/077568
§ 371 (c)(1),
(2) Date: Apr. 14, 2020

(87) PCT Pub. No.: WO2019/081037
PCT Pub. Date: May 2, 2019

(65) Prior Publication Data
US 2020/0245221 A1    Jul. 30, 2020

(51) Int. Cl.
*H04L 1/20* (2006.01)
*H04L 5/00* (2006.01)
(Continued)

(52) U.S. Cl.
CPC .......... *H04W 40/24* (2013.01); *H04L 1/0019* (2013.01); *H04L 1/189* (2013.01); *H04L 1/203* (2013.01); *H04L 5/0055* (2013.01); *H04W 84/18* (2013.01)

(58) Field of Classification Search
CPC .... H04W 40/24; H04W 84/18; H04L 1/0019; H04L 1/189; H04L 1/203; H04L 5/0055
See application file for complete search history.

(56) References Cited

U.S. PATENT DOCUMENTS 8,583,978 B2 * 11/2013 Shaffer ................. H04L 1/1867
714/749
2002/0045435 A1 * 4/2002 Fantaske ............... H04L 1/0002
455/403
(Continued)

FOREIGN PATENT DOCUMENTS

AU    2009202744 B2    5/2013
EP       2437440 A1    4/2012
(Continued)

OTHER PUBLICATIONS

PCT International Search Report, dated Jul. 13, 2018, in connection with International Application No. PCT/EP2017/077568, all pages.
(Continued)

*Primary Examiner* — Christopher M Crutchfield
*Assistant Examiner* — Tito Q Pham
(74) *Attorney, Agent, or Firm* — Leffler Intellectual Property Law, PLLC (57) ABSTRACT

A method of updating a number of retransmissions for a mesh node in a mesh network comprising a plurality of mesh nodes, wherein said number of retransmissions define how often said mesh node retransmits received messages within said mesh network, said method comprising the steps of receiving, by said mesh node, a number of data messages, wherein each of said data messages originates from a same source mesh node and is intended for a same destination mesh node in said mesh network, transmitting, by said mesh node, each of said number of data messages based on said number of retransmissions receiving, by said mesh node, a number of acknowledgement messages, wherein each acknowledgement message originates from said RD mesh node and acknowledges receipt of a particular data message of said first number of data messages, and updating, by said mesh node, said number of retransmissions based on said number of data messages and based on said number of (Continued)

acknowledgement messages. Complementary devices for performing a method according to the invention are also presented herein.

14 Claims, 3 Drawing Sheets

(51) Int. Cl.
*H04W 40/24* (2009.01)
*H04L 1/00* (2006.01)
*H04L 1/18* (2006.01)
*H04W 84/18* (2009.01)

(56) References Cited

U.S. PATENT DOCUMENTS

| | | | |
|---|---|---|---|
| 2009/0201928 A1* | 8/2009 | Chen | H04L 12/189 370/390 |
| 2013/0188562 A1 | 7/2013 | Espina Perez et al. | |
| 2015/0103658 A1* | 4/2015 | Okuno | H04W 28/0273 370/232 |
| 2015/0319064 A1 | 11/2015 | Oishi et al. | |
| 2018/0092041 A1* | 3/2018 | Choi | H04L 1/188 |

FOREIGN PATENT DOCUMENTS

| | | |
|---|---|---|
| JP | 5587888 B2 | 9/2014 |
| RU | 2490802 C2 | 8/2013 |
| WO | 2016015213 A1 | 2/2016 |
| WO | 2018151640 A1 | 8/2018 |

OTHER PUBLICATIONS

PCT Written Opinion, dated Jul. 13, 2018, in connection with International Application No. PCT/EP2017/077568, all pages.
International Preliminary Report on Patentability (IPRP), dated Oct. 11, 2019 in connection with International Application No. PCT/EP2017/077568, all pages.
English language translation of Russian Office Action, dated Sep. 10, 2020, in connection with Russian Application No. 2020117206/07, 8 pages.

* cited by examiner

METHOD AND DEVICE FOR UPDATING THE NUMBER OF RETRANSMISSIONS IN A WIRELESS MESH NETWORK

TECHNICAL FIELD

The present invention is generally related to wireless mesh network, more specifically to methods for updating the number of retransmissions for a particular mesh node of the mesh network.

BACKGROUND

A wireless mesh network, WMN, comprises a plurality of mesh nodes organized in a mesh topology. Here, each mesh node is also some sort of provider by forwarding data to the next mesh node. The network infrastructure is decentralized and simplified because each mesh node only needs to be able to transmit to a neighbouring mesh node. Such wireless mesh networks could allow people living in remote areas and small businesses operating in rural neighbourhoods to connect their networks together for affordable internet connections.

Wireless mesh network can self-form and self-heal. These networks can be implemented with various wireless technologies including 802.11, 802.15, 802.16, cellular technologies and do not need to be restricted to a particular technology or protocol.

Low-power wireless technologies use mesh network topologies to increase the network coverage and flexibility. A mesh network consists of machine devices, for instance sensors and actuators, and relay nodes, which have the capability to forward packets and eventually allow communication among nodes that are outside the radio range of each other.

The simplest and most straightforward networking method is flooding. In a flooding network, each relay that receives a packet will forward it. This method is robust to changes in the network topology. Also this approach fits well with the characteristics of devices in low power networks, which are usually constrained in terms of memory and computational resources.

In low power mesh networks that operate on the unlicensed band, each transmission from each node may cause interference or collisions on the wireless channel with other nodes transmissions. The more traffic is injected in the network, the more interference and collisions happen resulting in lost packets.

For unicast transmissions, technologies typically provide link layer acknowledgements to guarantee reliable hop-by-hop communication. In a mesh, on the other hand, a transmission has often several receivers, the data is often broadcasted. Typical way to increase reliability in broadcast wireless mesh networks is to blindly repeat the broadcast transmissions multiple times just in case the original attempt was lost.

Bluetooth mesh, officially launched in July 2017, is a highly-anticipated addition to the Internet of Things (IoT) connectivity space. The solution is based on flooding using broadcasting over a set of shared channels—the advertisement channels.

The application generates data messages associated to pre-defined Bluetooth Models. The Upper Transport layer provides encryption and authentication of application messages, together with control features. The Lower Transport layer provides segmentation and reassembly functionalities, including the transmission of end-to-end Segment Acknowledgment messages to acknowledge the reception of segmented messages. Segment Acknowledgement is mandatory for segmented packets, but it can be optionally used to acknowledge short packets when sent in a single segmented message. The Network layer takes care of forwarding messages through the appropriate bearer (e.g., Bluetooth Core v4.0 controller).

A node acting as a relay in a Bluetooth mesh network scans the advertisement channels for mesh packets. When a packet is detected and received the node checks if it is the destination of the packet—if yes, the packet content is sent to the application where it is processed. If the node is not the destination of the packet the node checks in a Network cache if it has already received and forwarded the packet. If yes, the packet is discarded. If not, the packet is forwarded in the mesh network by re-transmitting it over the advertisement channels so that the neighbours of the node can receive it. Typically, some random delay is introduced before forwarding the packet to avoid collisions. By means of this distributed mechanism the packet is forwarded from node to node(s) in the network until the packet arrives at the destination. To avoid loops with infinite retransmissions, some restrictions apply: if a message has been previously received, or it has been relayed more than a configured number of times (Time-to-Live), then it is discarded. However, in small scale deployments, it is expected that all nodes eventually receive messages generated in the network. Moreover, each message is transmitted multiple times by the originator and the relays, to increase the success probability.

Messages in a Bluetooth mesh network are secured with a two-level authentication and encryption mechanism. One key is used to secure the Network layer payload and it is known to all nodes belonging to the network. The Upper Transport layer uses a different key to authenticate and encrypt the application data. This key is shared only among nodes that share the same application. The purpose of splitting application keys from network keys is to allow application data to be transmitted via intermediary nodes, and allowing those nodes to authenticate these messages when they are relayed, without requiring the intermediary nodes to read or change the application data. For example, a light bulb should not be able to unlock doors. Nodes can relay application messages, using the network key, without having to know the application key and therefore without the ability to change or understand the application data.

European Patent Application EP 2437440 A1 discloses a method of adjusting the number of retransmissions based on distance between the source and destination nodes. Such a method does not factor in channel quality between two successive nodes.

International patent application WO2016/015213 discloses a method for adjusting number of repeated encoded packets to be transmitted in a wireless communication network. Such an approach utilizes the number of packets successfully decoded by the recipient and not the actual number of packets received. Furthermore, such a method cannot be applied to each intermediate node in a mesh network that is incapable of decoding messages for which it is not the intended recipient.

One of the drawbacks of the existing concepts is that there is no information available at a particular mesh node to locally determine whether a forwarded message has been successfully delivered or not.

SUMMARY

It is an objective to provide for a method of updating a number of retransmissions for a mesh node in a mesh network comprising a plurality of mesh nodes.

It is another objective to provide for a mesh node which is arranged to update a number of retransmissions which it pursues.

In a first aspect, there is provided a method of updating a number of retransmissions for a mesh node in a mesh network comprising a plurality of mesh nodes, wherein said number of retransmissions define how often said mesh node retransmits received messages within said mesh network.

The method comprises the step of receiving, by said mesh node, a number of data messages expecting an acknowledgement, wherein each of said data messages originates from a same source mesh node and is intended for a same destination mesh node in said mesh network.

In a further step, the method comprises the step of transmitting, by said mesh node, each of said number of data messages based on said number of retransmissions.

In another step, the method comprises the step of receiving, by said mesh node, receiving, by said mesh node, a number of acknowledgement messages, wherein each acknowledgement message originates from said destination mesh node and acknowledges receipt of a particular data message of said first number of data messages.

In yet a further step, the method comprises the step of updating, by said mesh node, said number of retransmissions based on said number of data messages and based on said number of acknowledgement messages.

It was found that, in mesh networks, often, the number of retransmissions is pre-configured and statically assigned during the provisioning phase of a mesh node, but it does not consider the dynamics of a deployed and operating mesh network. An overestimate of the number of retransmissions may degrade the network performance due to the increased congestion in the network.

In the application layer, the reception of status message from the destination mesh node can be interpreted by the source originator, or the source mesh node of a request/configuration message as an end-to-end acknowledgement for that message. However, this information may not available at intermediate mesh nodes in the network, since messages may only be processed by the intermediate mesh nodes up to the Lower Transport layer, and the application layer content is decrypted only by the source mesh node and the destination(s) of the message.

As a result, there may be no mechanism in mesh networks in place that allows mesh nodes to self-tune the number of Network layer transmissions based on an actual need.

Following the above, the present disclosure introduces a mechanism for a mesh node to collect message reception statistics of source mesh nodes and destination mesh node pairs, and tune a transmission behaviour based on those statistics.

In accordance with the present disclosure, a particular mesh node may receive data messages from any mesh node in the mesh network. The particular mesh node may even receive the same data message a couple of times, from the same mesh node or from a plurality of mesh nodes.

In such a case, a mesh node may decide to store a received data message in a memory. Each time that the same data message is received again, from for example the same mesh node or from a different mesh node, it is determined that the data message has already been received as the data message is already present in the memory. A particular data message may be considered to be received once, even though the same data message may be received, by a particular mesh node, multiple times. As such, each data message is either received at a particular mesh node, or it has not been received.

A same reasoning as provided above is applicable to the acknowledgement messages that are sent by the destination mesh node to the source mesh node. A particular mesh node in the mesh network may consider that an acknowledgement message has been received only once, even though that particular acknowledgement message may have been received multiple times, from the same or different mesh nodes.

In accordance with the above provided examples, the number of acknowledgement messages received cannot exceed the number of data messages received. As such, the ratio of acknowledgement messages received to the data messages received may be between zero and one.

An advantage of the method as described above is that the reliability of the mesh network is increased and that the medium congestion is reduced.

In an embodiment according to the present disclosure, the step of receiving said number of data messages comprises determining, by said mesh node, that a received message is a data message by identifying, in said received message, any of a Network layer destination, DST, field being a unicast address, a Network layer Network Control message indication bit, CTL, being set to zero and/or a Lower Transport layer Segment Indication bit, SEG, field being set to one.

The DST field is a 16-bit value that identifies the element or elements that a Network Protocol Data Unit, PDU, is directed towards. This address shall be a unicast address, a group address, or a virtual address. The DST field is set by the originating node and is untouched by the network layer in nodes operating as a relay node. The CTL field is a 1-bit value that is used to determine if the message is part of a Control Message or an Access Message. If the CTL field is set to 0, the Lower Transport PDU contains an Access Message. The most significant bit of the first octet of the Lower Transport PDU is the SEG field, which is used to determine if the Lower Transport PDU is formatted as a segmented or unsegmented message.

Therefore, a CTL bit being set to 0 and the SEG bit being set 1 together define that the lower transport PDU is segmented access message. This format is determined to be unique of data messages being sent towards a destination node. Furthermore, a node receiving a message wherein the lower transport layer SEG bit is set as 1 understands that a corresponding acknowledgement message is to be expected.

Any one or more of the above mentioned fields may be inspected to identify that the received message is a data message. However, for improving robustness, it may be beneficial to inspect all the above mentioned fields. It is further noted that the above described fields are typical for Bluetooth mesh packets.

Once a mesh node determines that the received message is a data message, the mesh node checks whether the same data message has been previously received by the node. If it has not been received, a local copy may be stored in the cache memory and a counter is activated to increment the number of received data messages by 1. If, after checking, it is determined that the data message has already been received by the node, the message may be discarded.

It may be understood that a separate count of received data messages is maintained for messages relating to different origin-destination pairs of nodes. Furthermore, it may be noted that all the mentioned fields are called in the portion of the message that is not encrypted by an application key and are visible to any node in the network.

As mentioned above, messages in a mesh network may be secured with a two-level authentication and encryption mechanism. One key is used to secure the Network layer payload and it is known to all nodes belonging to the network. The Upper Transport layer uses a different key to authenticate and encrypt the application data. This key is shared only among nodes that share the same application. Using this principle, any intermediate node is able to at least determined whether the received message is a data message, i.e. a message originating from the source mesh node and intended for the destination mesh node, or an acknowledgement message, i.e. a message originating from the destination mesh node and intended for the source mesh node, for acknowledging receipt of a data message.

According to an embodiment of the present disclosure, the step of receiving said number of acknowledgement messages comprises determining, by said mesh node, that a received message is an acknowledgement message by identifying, in said received message, any of a Network layer CTL field being set to one, a Lower Transport layer SEG field being set to zero and/or a Lower Transport layer Opcode being set to zero.

Similar to identifying the received message as a data message, a received message may be identified as being an acknowledgement message by inspecting one or more fields of Network layer CTL, Lower Transport layer SEG and/or Lower transport layer opcode. A CTL bit being set to 1 and the SEG bit being set 0 together define that the lower transport PDU is an unsegmented control message. Furthermore an opcode of 0 indicates that the unsegmented control message is a segment acknowledgement message. Preferably, the opcode is in a hexadecimal format and is specified as 0x00.

Any one or more of the above mentioned fields may be inspected to identify that the received message is a data message. However, for improving robustness, it may be beneficial to inspect all the above mentioned fields. For example, an opcode of 0x00 alone determines that the received message is a segment acknowledgement message, but additionally checking the CTL and the SEG bits improves the robustness of the method according to the present disclosure.

A BlockACK field may be present in the lower transport Packet Data Unit, PDU, i.e. the acknowledgement message, which contains information on which segments of a segmented message are acknowledged. In an alternative a single acknowledgement message may also acknowledge multiple segments in one go, which may be taken into account when determining the amount of retransmissions.

Once the node determines that the received message is an acknowledgement message, the node may check whether the same acknowledgement message has been previously received by the node. If it has not been received, the data message to which the received acknowledgement message corresponds is marked as being acknowledged and a counter may be activated to increment the number of received acknowledgement messages by one. If, after checking, it is determined that the data message has already been received by the node, the message may be discarded.

It may be understood that a separate count of received data messages may be maintained for messages relating to different origin-destination pairs of nodes. Furthermore, it may be noted that all the mentioned fields are called in the portion of the message that is not encrypted by the application key and are visible to any node in the network.

According to an embodiment of the disclosure, the step of updating, by said mesh node, said number of retransmissions comprises determining, by said mesh node, a reliability threshold being a ratio between said number of acknowledgement messages and said number of data messages, comparing, by said mesh node, said reliability threshold with a predefined threshold when said determined reliability threshold is non-zero, and setting said number of retransmissions as zero, when said reliability threshold is zero and increasing, by said mesh node, said number of retransmissions in case said reliability threshold falls below said predefined threshold and decreasing said number of retransmissions in case said reliability threshold exceeds said predefined threshold.

A reliability threshold is calculated as a ratio between the number of received acknowledgement messages and the number of received data messages. Since subsequent copies of a data message and an acknowledgement message are discarded, the number of received acknowledgement messages can never be greater than the number of received data messages. As a result, the reliability threshold has a maximum value of 1.

The determined reliability threshold is compared against a predefined threshold. If the reliability threshold is lower than the predefined threshold, the number of retransmissions is increased and if it is found that the reliability threshold is higher than the predefined threshold, the number of retransmissions is decreased. It may be understood that if it is found that the reliability threshold is equal to the predefined threshold the number of retransmissions is not adjusted.

If a node has a weak communication link in the network, not all the messages it sends out may be received by its neighbouring nodes. This will result in a low value of the reliability threshold at the node. Hence by increasing the number of retransmissions, the probability of the message being received by the neighbouring nodes is increased. Similarly, if a node has a good communication link in the network resulting in a reliability threshold higher than the predefined threshold, it is desirable to reduce the traffic in the network and therefore the number of retransmissions is reduced so as to reduce the number of redundant messages in the network.

Furthermore, when increasing the number of retransmissions, a maximum limit may be defined beyond which the number of retransmissions is not increased any more. In such a case, the node further checks whether the number of retransmissions is greater than the maximum limit and if so sets the number of retransmissions to the maximum limit. Similarly, a minimum number of retransmissions may be defined as 1. Therefore every node retransmits a message at least once. In such a case, the node checks, after updating the number of retransmission, whether the number of retransmissions is lower than 1, in such a case the number of retransmission is set as 1.

As a special case, the scenario wherein the reliability threshold is zero may be considered. Such a situation may arise when a node does not receive any acknowledgement messages for the received data messages. Such a situation occurs because the node is not in the path between a source node and a destination node. In this situation, it does not make sense for the node to broadcast the received messages thereby increasing traffic in the network. Therefore, if the reliability threshold is zero, the number of retransmissions is also set zero. So in the step of updating the number of retransmissions, four outcomes may be defined:

i. If reliability threshold is zero, the number of retransmissions is set as zero.
ii. If reliability threshold is greater than zero, but lower than a predefined threshold, then the number of retransmissions is incremented by 1, possibly being limited to a defined maximum number of retransmissions.

iii. If reliability threshold is equal to the predefined threshold, no change is made to the number of retransmissions.

iv. If reliability threshold is greater than the predefined threshold, then the number of transmissions is decremented by 1, possibly being limited by the minimum number of retransmission—usually 1.

It is noted that the number of retransmissions may be set to zero whenever the determined reliability threshold is zero. Such a precaution may be taken temporary to assure that the network does not stop functioning at all. That is, the number of retransmissions may be set to zero for a particular time out value, and after expiry of the time out value, the number of retransmissions may be set to a default value again. p The person skilled in the art understands that the specific outcome, wherein reliability threshold is equal to the predetermined threshold may be combined with the any one of the outcomes as specified in items ii. or iv.

According to an embodiment, the predefined threshold is between 0.7-0.9, preferably around 0.8. This ensures that most of the broadcasted messages have been acknowledged and at the same time ensures that the traffic in the network is not too high.

According to an embodiment of the present disclosure, the mesh node comprises a memory, and wherein said method comprises the steps of storing, by said mesh node, any received data messages in said memory, and correlating, by said mesh node, any received acknowledgement message with data messages stored in said memory.

As discussed earlier, it may be beneficial to maintain a record of the received messages for each source-destination node and to mark these messages as being acknowledged when a corresponding acknowledgement message has been received.

In an embodiment of the disclosure, the network is a Bluetooth Mesh type network. While the teachings of the present disclosure may be applied to any type of a wired or a wireless mesh network, the network is preferably a Bluetooth mesh type network.

In accordance with the present disclosure, different aspects applicable to the above mentioned examples of methods, including the advantages thereof, correspond to the aspects which are applicable to the nodes of the mesh network.

In a second aspect of the disclosure, there is provided a mesh node for updating a number retransmissions for said mesh node in a mesh network comprising a plurality of mesh nodes, wherein said number of retransmissions define how often said mesh node retransmits received messages within said mesh network, wherein said mesh node comprises receive equipment arranged for receiving a number of data messages, wherein each of said data messages originates from a same source mesh node and is intended for a same destination mesh node in said mesh network. The node further comprises transmit equipment arranged for transmitting each of said number of data messages based on said number of retransmissions. The receive equipment is further arranged for receiving a number of acknowledgement messages, wherein each acknowledgement message originates from said RD mesh node and acknowledges receipt of a particular data message of said first number of data messages, and wherein said mesh node further comprises a processor arranged for updating said number of retransmissions based on said number of data messages and based on said number of acknowledgement messages.

The advantages of the first aspect of the disclosure being a method of updating the number of retransmissions for a mesh node in a mesh network are also inherently a part of the second aspect of the disclosure.

In an example according to the second aspect of the disclosure, the receive equipment is further arranged for determining that a received message is a data message by identifying, in said received message, any of a Network layer destination, DST, field being a unicast address a Network layer CTL field being set to zero and/or a Lower Transport layer SEG field being set to one.

According to an example of the second aspect of the disclosure, the receive equipment is further arranged for determining that a received message is an acknowledgement message by identifying, in said received message, any of a Network layer CTL field being set to one a Lower Transport layer SEG field being set to zero, and/or a Lower Transport layer Opcode being set to zero.

In an embodiment of the second aspect of the disclosure, the processor is further arranged for determining a reliability threshold being a ratio between said number of acknowledgement messages and said number of data messages comparing said reliability threshold with a predefined threshold when said determined reliability threshold is non-zero, and setting said number of retransmissions as zero, when said reliability threshold is zero increasing said number of retransmissions in case said reliability threshold falls below said predefined threshold and decreasing said number of retransmissions in case said reliability threshold exceeds said predefined threshold.

In an embodiment of the second aspect of the disclosure, the predefined threshold is between 0.7-0.9, preferably around 0.8.

According to an example of the second aspect of the disclosure, the mesh node comprises a memory, and wherein said processor is further arranged for storing, by said mesh node, any received data messages in said memory, and correlating, by said mesh node, any received acknowledgement message with data messages stored in said memory.

According to a third aspect of the disclosure, there is provided a non-transitory computer-readable storage medium, comprising instructions which, when executed on at least one processor, cause the at least one processor to carry out the methods as explained above.

In this aspect of the disclosure, a computer readable storage medium is provided with instructions that enable a system on to which said storage media has been loaded to perform the method according to the present disclosure.

The above-mentioned and other features and advantages of the disclosure will be best understood from the following description referring to the attached drawings. In the drawings, like reference numerals denote identical parts or parts performing an identical or comparable function or operation.

DETAILED DESCRIPTION

Figure 1:
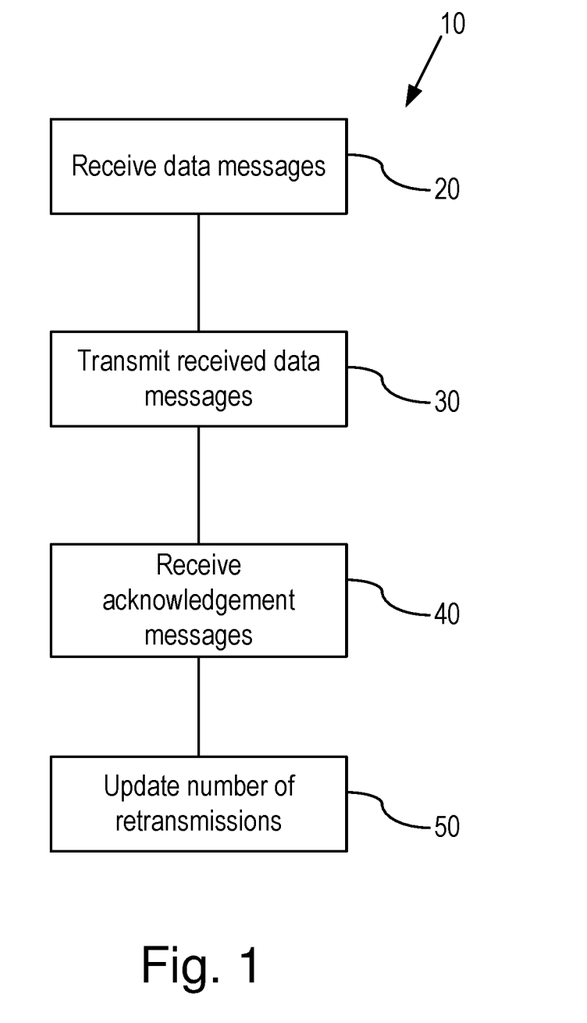
FIG. 1 schematically shows an implementation of a method according to the present disclosure FIG. 2 schematically shows an implementation of a method according to the present disclosure

FIG. 1 shows a schematic chart 10 illustrating the various steps performed by a node in a mesh network in order to perform a method according to the present disclosure. In a step of receiving 10, the mesh node receives a number of data messages. In a mesh network comprising a plurality of nodes, there is an source mesh node. The Source mesh node may alternately be referred to as an Origin Node, a Source Node, or a source mesh node. The Source mesh node may additionally also communicate with a server on which an application is running which initiates a request or sends information from the application to one or more nodes in the network.

The source mesh node sends information to a destination mesh node. The destination mesh node may also be referred to as a Destination node. While sending information from an Source mesh node to an Destination mesh node, it is usually not sent directly, but via intermediary nodes in the network. The information, may also be broken down into packets or messages of smaller sizes in order to better utilize the bandwidth. All the messages being sent, at least comprise an indication of the Source mesh node as well as the Destination mesh node along with the information to be sent.

In the step of receiving 20, the node may further identify the messages as being a data message. Such an identification may be performed by checking one or more fields of network layer destination, DST, network CT layer, and/or a lower transport layer SEG. Once a received message is identified as being a data message, a check may be performed by a processor of the node to determine that the received message has not already been received previously. Once a unique data message has been identified, the received data message may be stored locally in a memory available at the node and/or a counter may be activated to increment the number of received messages by 1.

In a mesh network, a message is propagated from an Source mesh node towards an Destination mesh node by a process known as flooding. In flooding, each node that receives a data message broadcasts it. Therefore in a next step, of transmitting 30, the node transmits the received data message to all its neighbouring nodes. It may be specified that the message is to be transmitted by the node a particular number of times. It is an objective of the invention to be able to adjust dynamically, the number of times a message is to be transmitted by a particular node.

The node, may before transmitting, check if the message has already been transmitted the defined number of times. In a further step of receiving 40, the node receives acknowledgement messages for the corresponding data messages that the node sent out. When an acknowledgement message is received, the node checks to which data message, the received acknowledgement message corresponds. Once identified, the node may additionally mark the data message as being acknowledged and/or activate a counter to increment the number of received acknowledgement messages by 1.

The node may check the data present in any of the fields of Network layer CTL, lower transport layer SEG field, and/or lower transport layer opcode in order to determine that a received message is an acknowledgement message. It may be understood that if an acknowledgement for a particular data message has already been received, subsequent acknowledgement messages received for the same data message may be discarded.

In a step of updating 50, the node then updates number of retransmissions to be performed by the node. Such an update is based on the number of received data messages and the number of received acknowledgement messages by the node for a particular pair of RO—Destination mesh nodes. The person skilled in the art understands that the separate counters, or separate entries indicating the count must be maintained in order to count the number of received information and acknowledgement messages for each RO—Destination mesh node.

Figure 2:
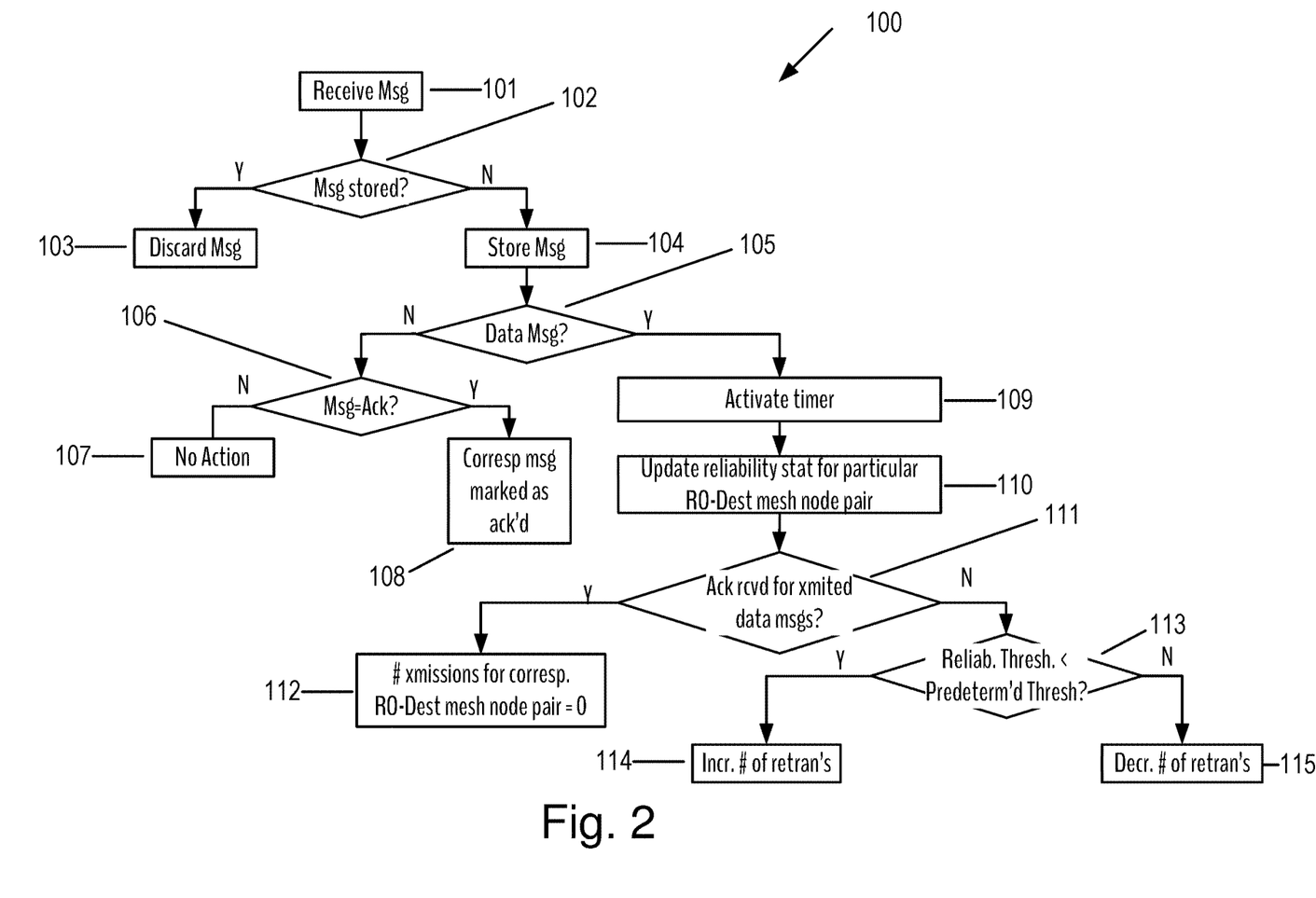

The exact sequence of steps to be performed by a node may be understood in detail by considering the flowchart 100 shown in FIG. 2. In a step 101, a message is received by a node in the mesh network. The node in step 102 determines whether the message is already stored in a cache memory of the node. If the message is already stored in the cache, then the message is discarded 103. This implies that if a message, irrespective of whether it is a data message or an acknowledgement message, has already been received at the node it is simply discarded without any further processing.

If however, the message is not yet available in the cache, it is stored 104 in the cache. In a next step of determining 105, the node determines whether the received message is a data message. This may be determined by checking one or more fields of Network destination layer DST being a unicast address, a network layer CTL field being set to zero and/or a lower transport layer SEF field being set to one.

If it is determined by the node that the received message is not a data message, the node then proceeds to check 106 whether the received message is an acknowledgement message. This may be determined by checking one or more fields of Network layer CTL field being set to one, a lower transport layer SEG field being set to zero and/or a lower transport layer Opcode being set to zero. If the message is also not an acknowledgement message, no action is performed 107. If the received message is an acknowledgement message, the corresponding data message is marked 108 as being acknowledged and further a counter is activated to increment the number of received acknowledgement messages.

If in step 105, it is determined that the received message is a data message, a timer is activated 109 to wait for a corresponding acknowledgement message and in step 110, the reliability statistics for a particular RO-Destination mesh node pair are updated. The person skilled in the art understands that the RO-Destination mesh node pair for which reliability statistics are updated is the RO-Destination mesh node pair which corresponds to the received data message. Furthermore in step 109, after determining that the received message is a data message, the number of received data messages may also be incremented by 1.

In step 111, it is checked whether any acknowledgement messages are received for the data messages transmitted by the node. If no acknowledgement messages for a particular RO-Destination mesh node pair are received by the node, it is interpreted that the node is not in the path between the RO-Destination mesh node pair. Therefore, it may be beneficial to stop transmitting any received messages for the particular RO-Destination mesh node pair, therefore reducing traffic in the network and saving energy. Therefore the number of transmissions for a corresponding RO-Destination mesh node pair is set 112 to zero.

If however, acknowledgement messages are being received, a reliability threshold is calculated. The reliability threshold may simply be defined as a ratio between the number of received acknowledgement messages to the number of received data messages. In a step 113, it is checked whether the reliability threshold is below a predetermined threshold. If the reliability threshold is below the predetermined threshold, the number of retransmission is incremented 114 by one. If however, the reliability threshold is greater than the predetermined threshold, the number of retransmissions is decremented 115 by one.

Although it is not shown in the figure, in a further step, if the reliability threshold is equal to the predetermined threshold, the number of retransmission may not be changed.

Figure 3:
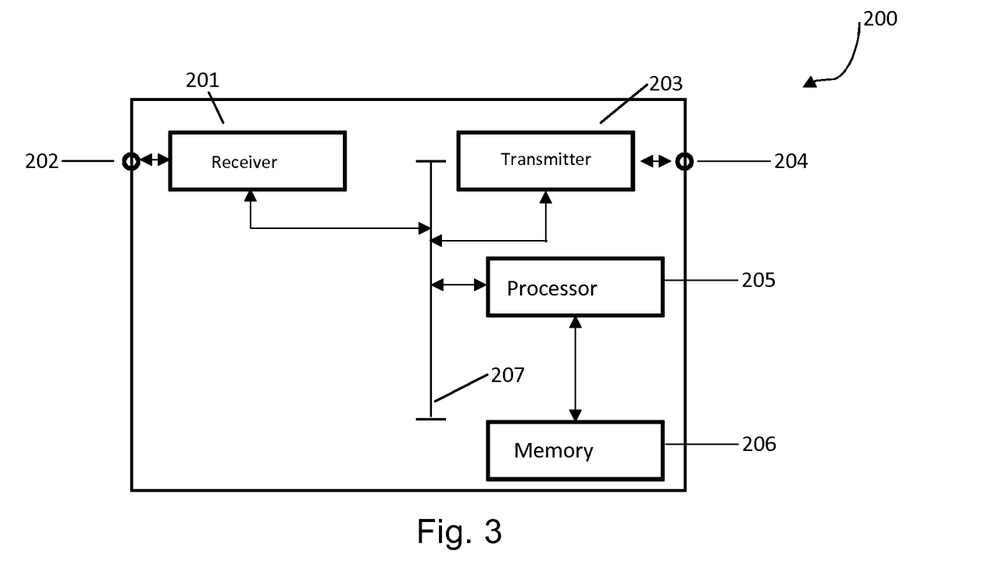
FIG. 3 is a schematic chart illustrating an example of a network element according to the present disclosure

In FIG. 3, reference number 200 illustrates a network element arranged for performing a method according to the present disclosure. Such a network element 200 may be a node, for example, in a mesh network of nodes. Such node 200 comprises of receiver means 201, 2012 arranged for receiving messages from neighbouring nodes of a network. The received messages may be data messages or acknowledgement messages. The node further comprises of transmitter means arranged for transmitting the received data messages to its neighbouring nodes.

The node 200 comprises a processor arranged for executing a method according to the present disclosure. Furthermore, the node 200 also comprises a memory 206. The memory 206 is arranged for storing a computer program product which when executed by the processor causes the node to perform a method according to the present disclosure. The memory 206 may also be arranged for storing copies of the received messages and maintaining a count of the received information and acknowledgement messages for each RO-Destination mesh node pair in the network.

Other variations to the disclosed examples can be understood and effected by those skilled in the art in practicing the claimed disclosure, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The present disclosure is not limited to the examples as disclosed above, and can be modified and enhanced by those skilled in the art beyond the scope of the present disclosure as disclosed in the appended claims without having to apply inventive skills.

The invention claimed is:

1. A method of updating a number of relaying transmissions for a mesh node in a mesh network comprising a plurality of mesh nodes, wherein said number of relaying transmissions define how often said mesh node relays received messages within said mesh network, said method comprising the steps of:
   receiving, by said mesh node, a number of data messages expecting an acknowledgement, wherein each of said data messages originates from a same source mesh node and is intended for a same destination mesh node in said mesh network;
   transmitting, by said mesh node, each of said number of data messages based on said number of relaying transmissions;
   receiving, by said mesh node, a number of acknowledgement messages, wherein each acknowledgement message originates from said destination mesh node and acknowledges receipt of a particular data message of said number of data messages; and
   updating, by said mesh node, said number of relaying transmissions based on said number of data messages and based on said number of acknowledgement messages.

2. A method in accordance with claim 1, wherein said step of receiving said number of data messages comprises:
   determining, by said mesh node, that a received message is a data message by identifying, in said received message, any of:
      a Network layer destination, DST, field being a unicast address;
      a Network layer Network control message indication, CTL, field being set to zero; and
      a Lower Transport layer Segment Indication Bit, SEG, being set to one.

3. A method in accordance with claim 1, wherein said step of receiving said number of acknowledgement messages comprises:
   determining, by said mesh node, that a received message is an acknowledgement message by identifying, in said received message, any of:
      a Network layer Network Control message indication, CTL, field being set to one;
      a Lower Transport layer Segment Indication Bit, SEG, being set to zero; and
      a Lower Transport layer Opcode being set to zero.

4. A method in accordance with claim 1, wherein said step of updating, by said mesh node, said number of relaying transmissions comprises:
   determining, by said mesh node, a reliability threshold being a ratio between said number of acknowledgement messages and said number of data messages;
   comparing, by said mesh node, said reliability threshold with a predefined threshold when said determined reliability threshold is non-zero, and setting said number of relaying transmissions as zero, when said reliability threshold is zero; and
   increasing, by said mesh node, said number of relaying transmissions in case said reliability threshold falls below said predefined threshold and decreasing said number of relaying transmissions in case said reliability threshold exceeds said predefined threshold.

5. A method in accordance with claim 4, wherein said predefined threshold is between 0.7-0.9.

6. A method in accordance with claim 1, wherein said mesh node comprises a memory, and wherein said method comprises the steps of:
   storing, by said mesh node, any received data messages in said memory; and
   correlating, by said mesh node, any received acknowledgement message with data messages stored in said memory.

7. A method in accordance with claim 1, wherein said network is a Bluetooth Mesh type network.

8. A mesh node for updating a number relaying transmissions for said mesh node in a mesh network comprising a plurality of mesh nodes, wherein said number of relaying transmissions define how often said mesh node relays received messages within said mesh network, wherein said mesh node comprises:
   receive equipment arranged for receiving a number of data messages expecting an acknowledgement, wherein each of said data messages originates from a same source mesh node and is intended for a same destination mesh node in said mesh network; and transmit equipment arranged for transmitting each of said number of data messages based on said number of relaying transmissions;

wherein said receive equipment is further arranged for receiving a number of acknowledgement messages, wherein each acknowledgement message originates from said destination mesh node and acknowledges receipt of a particular data messages of said number of data messages, and wherein said mesh node further comprises:

a processor arranged for updating said number of relaying transmissions based on said number of data messages and based on said number of acknowledgement messages.

9. A mesh node in accordance with claim 8, wherein said receive equipment is further arranged for:
determining that a received message is a data message by identifying, in said received message, any of:
a Network layer destination, DST, field being a unicast address;
a Network layer Network Control message indication bit, CTL, being set to zero; and
a Lower Transport layer Segment Indication bit, SEG, being set to one.

10. A mesh node in accordance with claim 8, wherein said receive equipment is further arranged for:
determining that a received message is an acknowledgement message by identifying, in said received message, any of:
a Network layer Network Control message indication bit, CTL, being set to one;
a Lower Transport layer Segment Indication bit, SEG, being set to zero; and
a Lower Transport layer Opcode being set to zero.

11. A mesh node in accordance with claim 8, wherein said processor is further arranged for:
determining a reliability threshold being a ratio between said number of acknowledgement messages and said number of data messages;
comparing said reliability threshold with a predefined threshold when said determined reliability threshold is non-zero, and setting said number of relaying transmissions as zero, when said reliability threshold is zero; and
increasing said number of relaying transmissions in case said reliability threshold falls below said predefined threshold and decreasing said number of relaying transmissions in case said reliability threshold exceeds said predefined threshold.

12. A mesh node in accordance with claim 11, wherein said predefined threshold is between 0.7-0.9.

13. A mesh node in accordance with claim 8, wherein said mesh node comprises a memory, and wherein said processor is further arranged for:
storing, by said mesh node, any received data messages in said memory; and
correlating, by said mesh node, any received acknowledgement message with data messages stored in said memory.

14. A non-transitory computer-readable storage medium, comprising instructions which, when executed on at least one processor, cause the at least one processor to carry out a method of updating a number of relaying transmissions for a mesh node in a mesh network comprising a plurality of mesh nodes, wherein said number of relaying transmissions define how often said mesh node relays received messages within said mesh network, said method comprising the steps of:
receiving, by said mesh node, a number of data messages expecting an acknowledgement, wherein each of said data messages originates from a same source mesh node and is intended for a same destination mesh node in said mesh network;
transmitting, by said mesh node, each of said number of data messages based on said number of relaying transmissions;
receiving, by said mesh node, a number of acknowledgement messages, wherein each acknowledgement message originates from said destination mesh node and acknowledges receipt of a particular data message of said number of data messages; and
updating, by said mesh node, said number of relaying transmissions based on said number of data messages and based on said number of acknowledgement messages.

* * * * *

UNITED STATES PATENT AND TRADEMARK OFFICE
CERTIFICATE OF CORRECTION

PATENT NO. : 11,153,803 B2
APPLICATION NO. : 16/756108
DATED : October 19, 2021
INVENTOR(S) : Larmo et al.

It is certified that error appears in the above-identified patent and that said Letters Patent is hereby corrected as shown below:

In the Specification

Column 7, Line 10, delete "temporary" and insert -- temporarily --, therefor.

Column 7, Line 14, delete "again. p" and insert -- again. --, therefor.

Column 7, Lines 14-18, delete "The person . . . . or iv." and insert the same at Line 15, as a new paragraph.

Column 7, Line 46, delete "number" and insert -- number of --, therefor.

Column 9, Line 2, delete "an source" and insert -- a source --, therefor.

In the Claims

Column 12, Lines 57-58, Claim 8, delete "number relaying transmissions" and insert -- number of relaying transmissions --, therefor.

Signed and Sealed this
Tenth Day of May, 2022

Katherine Kelly Vidal
*Director of the United States Patent and Trademark Office*